(12) United States Patent
Mori et al.

(10) Patent No.: US 11,746,889 B2
(45) Date of Patent: Sep. 5, 2023

(54) SHIFT DEVICE THAT ENABLES DETECTION ACCURACY TO BE IMPROVED

(71) Applicant: KABUSHIKI KAISHA TOKAI-RIKA-DENKI-SEISAKUSHO, Aichi-ken (JP)

(72) Inventors: Hayato Mori, Aichi-ken (JP); Hiroki Ono, Aichi-ken (JP); Masatsugu Shimizu, Aichi-ken (JP); Masaaki Shiozaki, Aichi-ken (JP); Yoya Ogawa, Aichi-ken (JP); Takuya Sasaki, Aichi-ken (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 17/222,677

(22) Filed: Apr. 5, 2021

(65) Prior Publication Data
US 2021/0317910 A1    Oct. 14, 2021

(30) Foreign Application Priority Data
Apr. 13, 2020   (JP) ................ 2020-071909

(51) Int. Cl.
*F16H 59/08*   (2006.01)
*F16H 59/04*   (2006.01)

(52) U.S. Cl.
CPC .......... *F16H 59/08* (2013.01); *F16H 59/044* (2013.01); *F16H 2059/081* (2013.01)

(58) Field of Classification Search
CPC .... H01H 25/065; B60H 1/0065; B60K 37/06; G05G 1/10; G05G 1/105; G05G 1/087; G05G 1/08; G05G 1/02; F16H 2059/081; F16H 59/044; F16H 59/08; F16H 59/02; G01D 5/145; G01D 5/142; G01D 5/12; G01D 5/00
(Continued)

(56) References Cited

U.S. PATENT DOCUMENTS

2002/0152828 A1 * 10/2002 Nagasaka ............... F16H 59/12
                                                              74/473.23
2009/0000413 A1    1/2009 Furhoff et al.
(Continued)

FOREIGN PATENT DOCUMENTS

EP    1655516 A2 *  5/2006  ............. B60K 37/06
EP    3217533 A1 *  9/2017  ............. H02P 6/085
(Continued)

*Primary Examiner* — Charles A Fox
*Assistant Examiner* — T. Scott Fix
(74) *Attorney, Agent, or Firm* — Thomas W. Cole; Calderon Safran & Cole P.C.

(57) ABSTRACT

In a shift device, a shift position of a knob is altered as a result of a knob being rotated. Furthermore, a Hall IC on a wiring substrate detects a rotation position of a magnet in the knob, thereby enabling the shift position of the knob to be detected. Here, the Hall IC is placed on an outer side in a rotation radial direction of the magnet. Because of this, it is possible to enlarge the change in the relative position between the magnet and the Hall IC that is generated by the rotation of the magnet, thereby enabling the detection accuracy when detecting the shift position of the knob to be improved.

6 Claims, 4 Drawing Sheets

(58) Field of Classification Search
USPC .................................................... 74/473.12
See application file for complete search history.

(56) References Cited

U.S. PATENT DOCUMENTS

| | | | | |
|---|---|---|---|---|
| 2014/0345409 | A1* | 11/2014 | Watanabe | ............... F16H 59/08 |
| | | | | 74/473.3 |
| 2015/0226317 | A1* | 8/2015 | Provenza | ............... F16H 59/08 |
| | | | | 74/473.21 |
| 2018/0259063 | A1* | 9/2018 | Wang | ..................... F16H 61/22 |

FOREIGN PATENT DOCUMENTS

| | | | | |
|---|---|---|---|---|
| JP | 2009-519855 A | | 7/2007 | |
| JP | 2011218851 A | * | 11/2011 | ............ B60K 37/06 |
| KR | 20160000816 A | * | 1/2016 | |
| WO | WO-2011023267 A1 | * | 3/2011 | ............ F16H 59/08 |
| WO | WO-2017142533 A1 | * | 8/2017 | |
| WO | WO-2018233969 A1 | * | 12/2018 | ............ B60K 37/06 |

* cited by examiner

FIG.3A
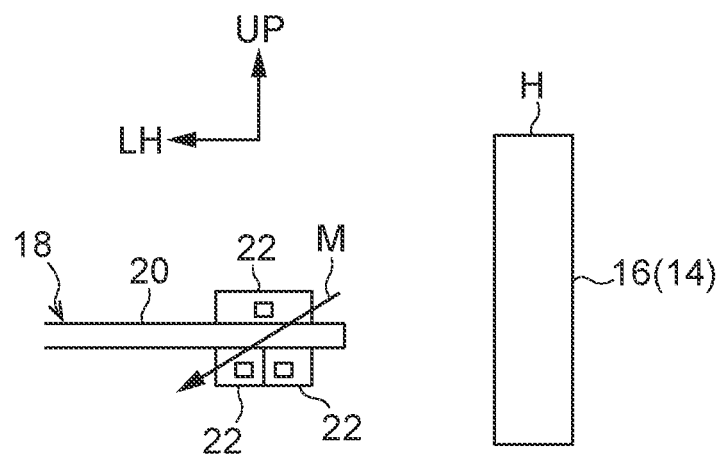
FIG.3B
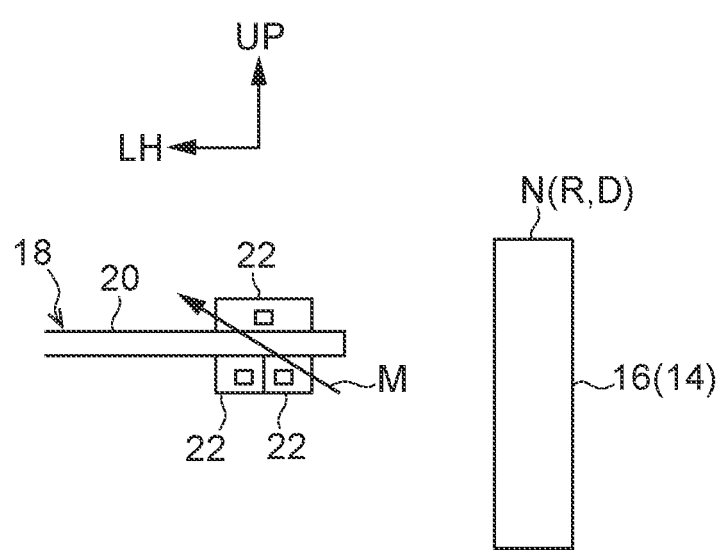

SHIFT DEVICE THAT ENABLES DETECTION ACCURACY TO BE IMPROVED

CROSS-REFERENCE TO RELATED APPLICATION

This application is based on and claims priority under 35 USC 119 from Japanese Patent Application No. 2020-71909 filed on Apr. 13, 2020, the disclosure of which is incorporated by reference herein.

BACKGROUND

Technical Field

The present disclosure relates to a shift device in which a shift position of a shift body is altered as a result of the shift body being rotated.

Related Art

In a shift device described in Japanese Unexamined Patent Application Laid-Open (JP-A) No. 2009-519855, as a result of an operating element being rotated so as to rotate a permanent magnet, a shift position of the operating element is detected by detecting a relative rotation position between the permanent magnet and a Hall effect element.

Here, in this shift device, the Hall effect element is disposed on an inner side in a rotation radial direction of the permanent magnet.

SUMMARY

The present disclosure was conceived in view of the above-described circumstances, and it is an object thereof to provide a shift device that enables a detection accuracy when detecting a shift position of a shift body to be improved.

A shift device of a first aspect of the present disclosure is provided with a shift body that has a shift position which is altered as a result of the shift body being rotated towards a circumferential direction side; a rotating portion that is rotated as a result of the shift body being rotated; and a detection mechanism that is provided with a placement portion which is disposed at an outer side in a rotation radial direction of the rotating portion, the shift position of the shift body being detected as a result of a relative position between the rotating portion and the placement portion being detected.

In the shift device of the first aspect of the present disclosure, the shift body is rotated towards the circumferential direction side thereby resulting in the shift position of the shift body being altered. In addition, the rotating portion is rotated as a result of the shift body being rotated. Furthermore, the placement portion is provided at the detection mechanism, and the shift position of the shift body is detected as a result of the relative position between the rotating portion and the placement portion being detected.

Here, the placement portion is disposed at the outer side in the rotation radial direction of the rotating portion. Because of this, it is possible to enlarge the change in the relative position between the rotating portion and the placement portion that is generated by the rotation towards the circumferential direction side of the rotating portion, thereby enabling the detection accuracy when detecting the shift position of the shift body to be improved.

A shift device of a second aspect of the present disclosure is characterized in that, in the shift device of the first aspect of the present disclosure, the rotating portion is provided integrally with the shift body.

In the shift device of the second aspect of the present disclosure, the rotating portion is provided integrally with the shift body. Because of this, the structure can be simplified.

A shift device of a third aspect of the present disclosure is characterized in that, in the shift device of the first aspect or second aspect of the present disclosure, as a result of the shift body being displaced towards an axial direction side thereof, the shift position of the shift body is altered and the relative position between the rotating portion and the placement portion is altered between one side and another side.

In the shift device of the third aspect of the present disclosure, the shift position of the shift body is altered as a result of the shift body being displaced towards the axial direction side thereof.

Here, the relative position between the rotating portion and the placement portion is altered between one side and another side as a result of the shift body being displaced towards the axial direction side thereof. Because of this, it is possible to enlarge the change in the relative position between the rotating portion and the placement portion that is generated by the displacement towards the axial direction side of the shift body, thereby enabling the detection accuracy, when detecting the shift position of the shift body, to be improved.

A shift device of a fourth aspect of the present disclosure is characterized in that, in the shift device of any one of the first aspect through the third aspect of the present disclosure, there is further provided a placement component at which the placement portion is disposed, and that is disposed perpendicularly relative to a shift body axial direction side.

In the shift device of the fourth aspect of the present disclosure, the placement portion is disposed at the placement component, and the placement component is disposed perpendicularly relative to the shift body axial direction side. Because of this, a mechanism other than the detection mechanism can be easily installed at the placement component.

BRIEF DESCRIPTION OF THE DRAWINGS

Exemplary embodiments of the present disclosure will be described in detail based on the following figures, wherein:

FIG. 3A is a side surface view as seen from the rear showing a detection status of an 'H' position of the knob of the shift device according to the exemplary embodiment of the present disclosure;

FIG. 3B is a side surface view as seen from the rear showing a detection status of the 'N' position of the knob of the shift device according to the exemplary embodiment of the present disclosure;

DETAILED DESCRIPTION

Figure 1:
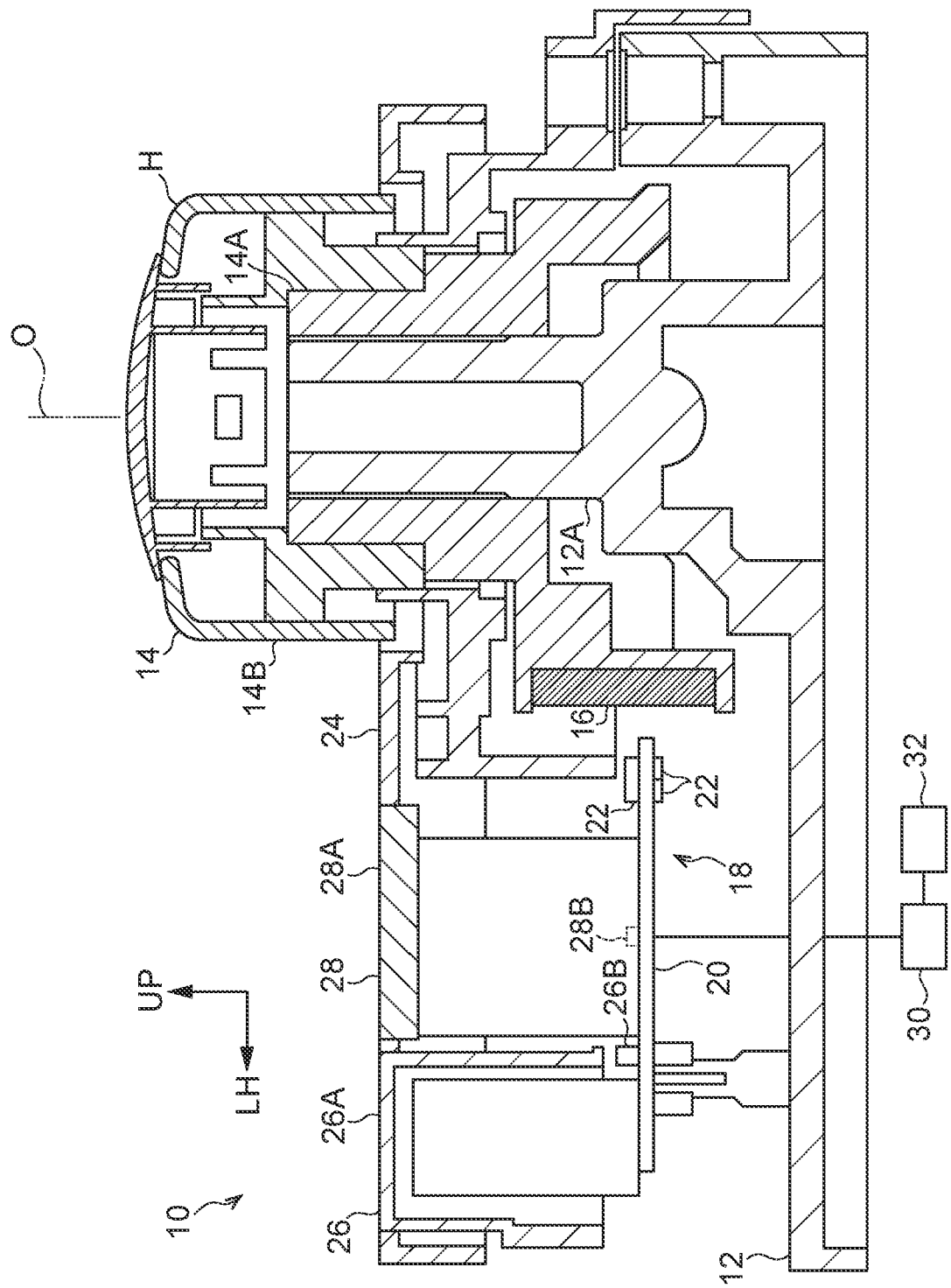
FIG. 1 is a cross-sectional view as seen from the rear showing a shift device according to an exemplary embodiment of the present disclosure.

A shift device 10 according to an exemplary embodiment of the present disclosure is shown in FIG. 1 in a cross-sectional view as seen from the rear. Note that an arrow FR, an arrow LH, and an arrow UP that are shown in the appropriate drawings respectively indicate a front side of the shift device 10, a left side of the shift device 10, and an upper side of the shift device 10.

The shift device 10 according to the present exemplary embodiment is installed in a console (not shown in the drawings) of a vehicle (i.e., an automobile), and is disposed on a vehicle front-side and inner side in a vehicle width direction of a driver's seat (not shown in the drawings) of the vehicle. The front side, left side, and upper side of the shift device 10 face respectively towards the front side, left side, and upper side of the vehicle.

Figure 2A:
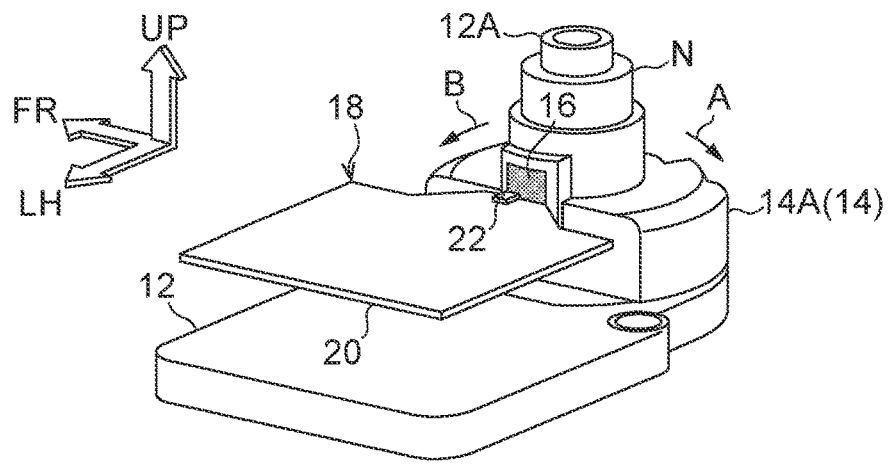
FIG. 2A is a perspective view as seen from a left-side diagonally rearward direction showing a state in which a knob of the shift device according to the exemplary embodiment of the present disclosure has been placed in an 'N' position.

As is shown in FIG. 1, a substantially rectangular parallelepiped-box shaped plate 12 (see FIG. 2A), which serves as a supporting body, is provided in the shift device 10, and an interior of the plate 12 is open on the lower side thereof. The plate 12 is fixed inside the console, and an upper wall of the plate 12 is disposed so as to be perpendicular to the up-down direction. A substantially circular-cylinder shaped supporting cylinder 12A is formed integrally with a right-side portion of the plate 12, and this supporting cylinder 12A protrudes upwards so as to extend above the upper side of the console.

A knob 14 (see FIG. 2A), which is shaped substantially as a circular cylinder having one closed end and serves as a shift body, is supported on the supporting cylinder 12A of the plate 12, and the interior of the knob 14 is open on the lower side thereof.

A substantially circular-cylinder shaped knob base 14A, which serves as a shift component, is provided in a lower-side portion of the knob 14, and the supporting cylinder 12A is fitted inside the knob base 14A so as to be coaxial therewith. As a result, the knob 14 is supported by the supporting cylinder 12A, and the knob 14 is able to be displaced (i.e., slid) in an up-down direction along a central axis O (see FIG. 1), and is also able to be rotated in one direction A and in another direction B (see FIG. 2A) around the central axis O.

A knob upper 14B, which is shaped substantially as a circular cylinder having one closed end and serves as an operating component, is fixed to an upper side of the knob base 14A so as to be coaxial therewith. The knob upper 14B is able to be displaced and rotated integrally with the knob base 14A. The knob upper 14B is exposed to the vehicle cabin interior of the vehicle, and a vehicle occupant (particularly the driver) is able to operate the knob 14 using the knob upper 14B.

Figure 2B:
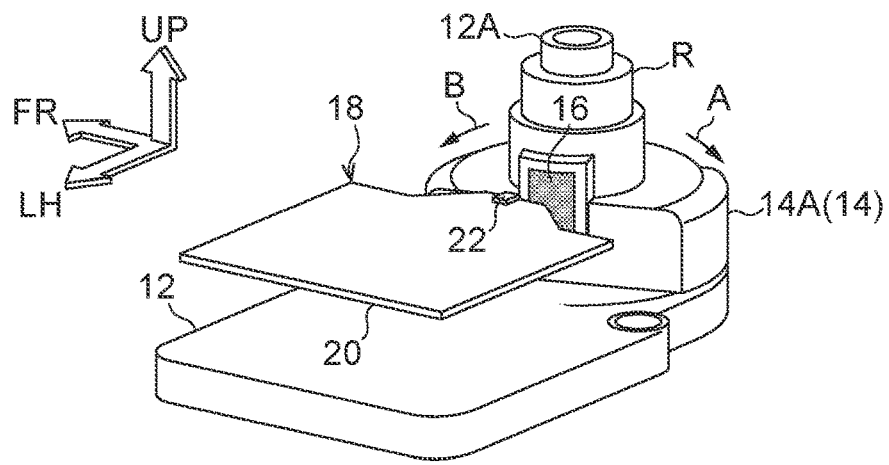
FIG. 2B is a perspective view as seen from a left-side diagonally rearward direction showing a state in which the knob of the shift device according to the exemplary embodiment of the present disclosure has been placed in an 'R' position.
Figure 2C:
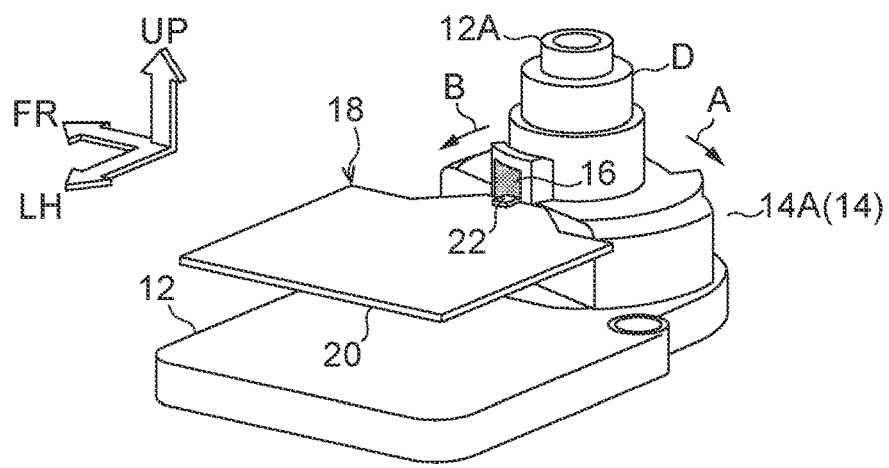
FIG. 2C is a perspective view as seen from a left-side diagonally rearward direction showing a state in which the knob of the shift device according to the exemplary embodiment of the present disclosure has been placed in a 'D' position.

The knob 14 is placed in an 'H' position (i.e., a Home position), which serves as a shift position. As a result of the knob 14 being displaced downwards from the 'H' position, the knob 14 is placed in an 'N' position (i.e., a Neutral position) (see FIG. 2A), which serves as a shift position. Furthermore, the knob 14 is placed in an 'R' position (i.e., a Reverse position) (see FIG. 2B), which serves as a shift position, by being rotated in the other direction B from the 'N' position, and is placed in a 'D' position (i.e., a Drive position) (see FIG. 2C), which serves as a shift position, by being rotated in the one direction A from the 'N' position. The knob 14 is urged from the 'N' position to the 'H' position side, and is also urged from the 'R' position and the 'D' position to the 'N' position side. In a state in which the knob 14 has been operated to a position other than the 'H' position, then once the action of the operating force on the knob 14 is released, the knob 14 is restored (i.e., is rotated and displaced) to the 'H' position by this urging force.

A substantially rectangular-plate shaped magnet 16, which serves as a rotating portion, is provided via, for example, insert molding integrally with an end portion on the lower side and left side of the knob 14 (i.e., the knob base 14A). The magnet 16 is able to be displaced and also rotated integrally with the knob 14. The magnet 16 is disposed so as to be perpendicular to the left-right direction, and a longitudinal direction thereof is parallel to the up-down direction. For example, a left surface of the magnet 16 may have an N polarity, and a right surface thereof may have an S polarity, and the magnet 16 generates magnetic flux M (see FIG. 3A).

A detection mechanism 18 is provided on a left side of the magnet 16.

A substantially rectangular-plate shaped wiring substrate 20, which serves as a placement component, is provided in the detection mechanism 18. The wiring substrate 20 is disposed on an upper side of the left-side portion of the plate 12 so as to be perpendicular to the up-down direction. A plurality of (three in the present exemplary embodiment) Hall IC 22 (what are known as 3D Hall IC), which serve as placement portions, are fixed to a right-end portion in a center in the front-rear direction of the wiring substrate 20. The Hall IC 22 are disposed on an upper surface and a lower surface of the wiring substrate 20 in such a way that their placement positions are slightly offset relative to each other.

Figure 4A:
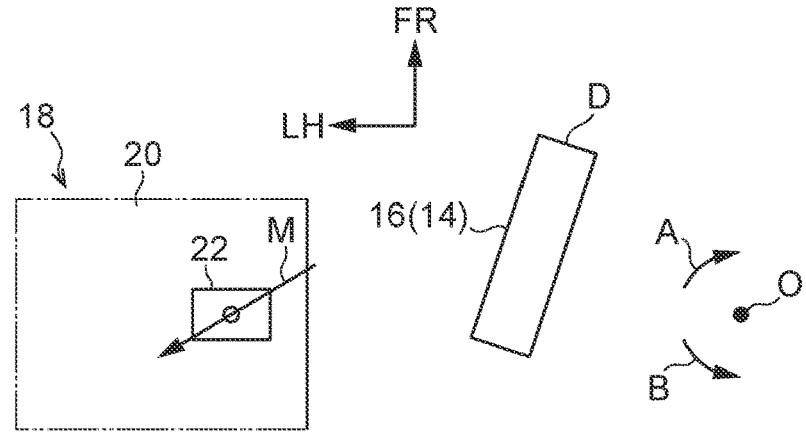
FIG. 4A is an upper surface view as seen from above showing a detection status of the 'D' position of the knob of the shift device according to the exemplary embodiment of the present disclosure.
Figure 4B:
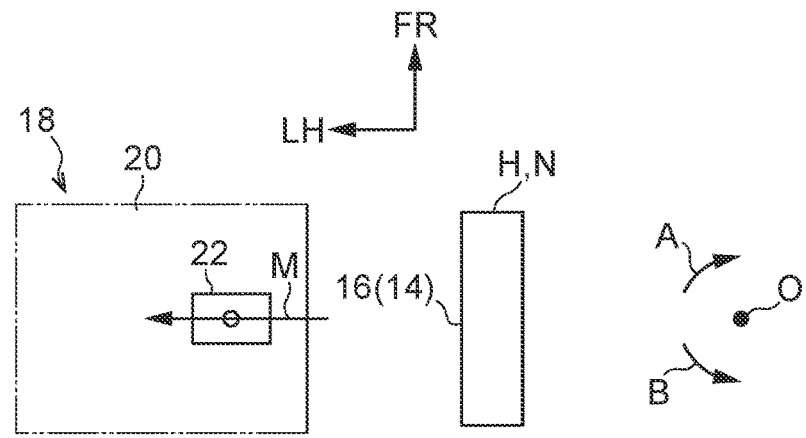
FIG. 4B is an upper surface view as seen from above showing a detection status of the 'H' position and the 'N' position of the knob of the shift device according to the exemplary embodiment of the present disclosure.

The Hall IC 22 are disposed in a vicinity of the left side of the magnet 16 (i.e., the outer side in the rotation radial direction of the magnet 16) of the knob 14. As is described above, the knob 14 is disposed in the 'H' position, and the Hall IC 22 are disposed on the lower side and left direction of a center of the left surface (i.e., the N pole) of the magnet 16, and a direction in the Hall IC 22 of the magnetic flux M generated by the magnet 16 is a direction of heading towards the lower side while heading towards the left direction (see FIG. 3A and FIG. 4B). When the knob 14 is disposed in the 'N' position, the Hall IC 22 are disposed on the upper side and left direction of the center of the left surface (i.e., the N pole) of the magnet 16, and the direction in the Hall IC 22 of the magnetic flux M generated by the magnet 16 is a direction of heading towards the upper side while heading towards the left direction (see FIG. 3B and FIG. 4B).

Figure 4C:
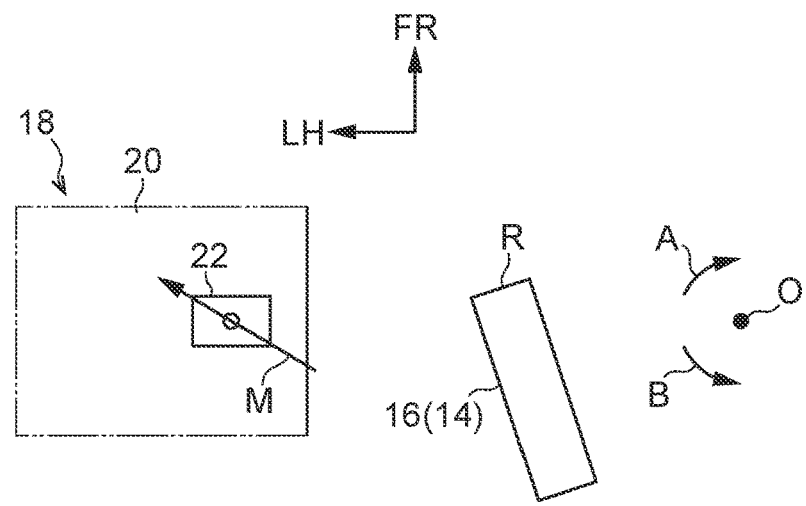
FIG. 4C is an upper surface view as seen from above showing a detection status of the 'R' position of the knob of the shift device according to the exemplary embodiment of the present disclosure.

When the knob 14 is disposed in the 'R' position, the Hall IC 22 are disposed on the upper side and front side of the center of the left surface (i.e., the N pole) of the magnet 16, and the direction in the Hall IC 22 of the magnetic flux M generated by the magnet 16 is a direction of heading towards the upper side and front side while heading towards the left direction (see FIG. 3B and FIG. 4C). When the knob 14 is disposed in the 'D' position, the Hall IC 22 are disposed on the upper side and rear side of the center of the left surface (i.e., the N pole) of the magnet 16, and the direction in the Hall IC 22 of the magnetic flux M generated by the magnet 16 is a direction of heading towards the upper side and rear side while heading towards the left direction (see FIG. 3B and FIG. 4A).

As can be seen from the above, as a result of the Hall IC 22 detecting the direction in the Hall IC 22 of the magnetic flux M generated by the magnet 16, and by detecting the relative positions between the magnet 16 and the Hall IC 22, the displacement position and rotation position of the knob 14 (i.e., of the magnet 16) can be detected, and the shift position of the knob 14 also detected.

A substantially rectangular parallelepiped-box shaped cover 24, which serves as a covering body, is provided on the upper side of the shift device 10, and the interior of the cover 24 is open on the lower side thereof, while an upper surface thereof is exposed to the upper side of the console (i.e., to the vehicle cabin interior). The cover 24 covers the upper side of the plate 12 and the wiring substrate 20, and the knob 14 (i.e., the knob upper 14B) is inserted through the right-side portion of the cover 24.

A switch mechanism 26, which serves as an operating mechanism, is provided on a left-end portion of the cover 24. A 'P' switch 26A, which serves as an operating portion and is formed in a cylindrical shape having one closed end, is provided in the switch mechanism 26. An interior of the 'P' switch 26A is open on the lower side thereof, and the 'P' switch 26A is disposed on the upper side of the wiring substrate 20. An upper surface of the 'P' switch 26A is flush with the upper surface of the cover 24, and the 'P' switch 26A can be operated by being pressed by a vehicle occupant. An operation sensor 26B, which serves as an operation detection portion, is provided in the switch mechanism 26. The operation sensor 26B is fixed onto the wiring substrate 20, and detects when the 'P' switch 26A is operated by being pressed.

An indicator 28, which serves as an illuminating mechanism, is provided in the cover 24 on the right side of the switch mechanism 26. A planar display plate 28A, which serves as an illumination portion, is provided in the indicator 28. The display plate 28A is fixed onto an upper wall of the cover 24, and is disposed so as to be perpendicular to the up-down direction. An upper surface of the display plate 28A is flush with the upper surface of the cover 24, and a vehicle occupant is able to view the display plate 28A from above. A predetermined number of LED 28B, which serve as light-emitting portions, are provided in the indicator 28. The LED 28B are fixed onto the wiring substrate 20, and are able to emit light.

The wiring substrate 20 (i.e., the Hall IC 22, the operation sensor 26B, and the LED 28B) is electrically connected to a control device 30 of a vehicle, and an automatic transmission 32 (i.e., a transmission) of a vehicle is electrically connected to the control device 30.

Next, actions of the present exemplary embodiment will be described.

In the shift device 10 having the above-described structure, in the switch mechanism 26, when the 'P' switch 26A is operated by being pressed (i.e., when the operation sensor 26B of the wiring substrate 20 has detected that the 'P' switch 26A has been operated by being pressed), the shift range of the automatic transmission 32 is altered via control performed by the control device 30 to the 'P' range (i.e., the parking range).

The shift position of the knob 14 is altered as a result of the knob 14 being displaced in the up-down direction (i.e., to the axial direction side) and also rotated in the one direction A or the other direction B (i.e., to the circumferential direction side). When the knob 14 is shifted from the 'H' position to the 'N' position, the 'R' position, or the 'D' position (i.e., when the Hall IC 22 of the wiring substrate 20 have detected that the knob 14 (i.e., the magnet 16) has been shifted from the 'H' position to the 'N' position, the 'R' position, or the 'D' position), the shift range of the automatic transmission 32 is altered via control performed by the control device 30 respectively to the 'N' range (i.e., the neutral range), the 'R' range (i.e., the reverse range), or the 'D' range (i.e., the drive range).

Furthermore, in the indicator 28, the LED 28B of the wiring substrate 20 emit light via control performed by the control device 30, and the shift range of the automatic transmission 32 is displayed in illumination on the upper side of the display panel 28A.

Here, the Hall IC 22 of the wiring substrate 20 are disposed on the outer side in the rotation radial direction (i.e., on the right side) of the magnet 16 of the knob 14. Because of this, the change in the relative positions between the magnet 16 and the Hall IC 22 that is caused by the rotation of the magnet 16 in a rotation circumferential direction (either the one direction A or the other direction B) can be enlarged, so that the change in the direction in the Hall IC 22 of the magnetic flux M generated by the magnet 16 that is caused by the rotation of the magnet 16 in a rotation circumferential direction can also be enlarged, and the detection accuracy when the rotation position of the magnet 16 is detected by the Hall IC 22 can be improved, so that the detection accuracy when detecting the shift position of the knob 14 can also be improved.

Furthermore, the knob 14 is displaced in the up-down direction, so that the relative positions between the center of the left surface of the magnet 16 and the Hall IC 22 are altered between the upper side and the lower side (i.e., between the one side and the other side in the rotation axial direction of the magnet 16). Because of this, the change in the relative positions between the magnet 16 and the Hall IC 22 that is caused by the displacement of the magnet 16 in the up-down direction can be enlarged, so that the change in the direction in the Hall IC 22 of the magnetic flux M generated by the magnet 16 that is caused by the displacement of the magnet 16 in the up-down direction can also be enlarged, and the detection accuracy when the displacement position of the magnet 16 is detected by the Hall IC 22 can be improved, so that the detection accuracy when detecting the shift position of the knob 14 can also be improved.

Moreover, a plurality of the Hall IC 22 are provided. Because of this, there is an increased level of redundancy in the detection of the shift position of the knob 14 so that the detection accuracy when detecting the shift position of the knob 14 is effectively improved.

Moreover, the magnet 16 is provided integrally with the knob 14. Because of this, there is no need to provide a connecting mechanism for connecting the knob 14 and the magnet 16 together, so that the structure can be simplified. As a consequence, the accuracy of the displacement position and the rotation position of the magnet 16 that result from the displacement and rotation of the knob 14 are improved, so that the detection accuracy when detecting the shift position of the knob 14 is improved even more. In addition, the number of parts required can be reduced, so that costs can also be curtailed, and the size of the shift device 10 can be reduced.

Furthermore, the wiring substrate 20 on which the Hall IC 22 are disposed is arranged so as to be perpendicular to the axial direction of the knob 14 (i.e., to the up-down direction). Because of this, the switch mechanism 26 and the indicator 28, in addition to the detection mechanism 18, can be mounted easily on the upper side of the wiring substrate 20. Moreover, the same wiring substrate 20 can be used by the detection mechanism 18, the switch mechanism 26, and the indicator 28, so that the number of parts required can be reduced, costs can also be curtailed, and the size of the shift device 10 can be reduced.

Note that, in the present exemplary embodiment, the Hall IC 22 are disposed on the inner side in the rotation axial direction of the magnet 16 (i.e., on the inner side in the up-down direction). However, it is also possible for the Hall IC 22 to be disposed on the outer side in the rotation axial direction of the magnet 16 (i.e., on the outer side in the up-down direction).

Furthermore, in the present exemplary embodiment, the magnet 16 is provided integrally with the knob 14 by means of insert molding. However, it is also possible for the magnet to be assembled together with the knob 14 so as to form an integrated body.

Moreover, in the present exemplary embodiment, because the magnet 16 is provided integrally with the knob 14, when the knob 14 is rotated, the magnet 16 is also rotated. However, by connecting the magnet 16 to the knob 14 via a connecting mechanism (i.e., a linking mechanism or a gear mechanism or the like), it is possible to cause the magnet 16 to rotate via the connecting mechanism when the knob 14 is rotated.

Furthermore, in the present exemplary embodiment, the magnet 16 is provided on the knob 14 side, and the Hall IC 22 are provided independently of the knob 14 side. However, it is also possible to provide the Hall IC 22 (i.e., the rotating portion) on the knob 14 side, and to provide the magnet 16 (i.e., the placement portion) independently of the knob 14 side.

Furthermore, in the present exemplary embodiment, the shift device 10 is installed in a console. However, it is also possible for the shift device 10 to be installed another portion of the vehicle (such as the instrument panel or the steering column cover or the like).

An exemplary embodiment of the present disclosure has been described above, however, the present disclosure is not limited to this. Various modifications and the like may be made to the present disclosure insofar as they do not depart from the spirit or scope of the present disclosure.

What is claimed is:

1. A shift device, comprising:
   a shift body that has a shift position which is altered as a result of the shift body being rotated towards a circumferential direction side;
   a rotating portion that is rotated as a result of the shift body being rotated; and
   a detection mechanism that is provided with a placement portion which is disposed at an outer side in a rotation radial direction of the rotating portion, the shift position of the shift body being detected as a result of the placement portion detecting a relative position with respect to the rotating portion,
   wherein as a result of the shift body being displaced towards an axial direction side thereof and the relative position of the rotating portion with respect to the placement portion being altered between one side of the placement portion and another side of the placement portion, the shift position of the shift body is altered,
   wherein the relative position is a difference in a radial direction relative to the axis of the rotating portion, and
   wherein an axial center point of the rotating portion is altered between one axial side of the placement portion and another axial side of the placement portion.

2. The shift device according to claim 1, wherein the rotating portion is provided integrally with the shift body.

3. The shift device according to claim 1, further comprising a placement component at which the placement portion is disposed, and that is disposed perpendicularly relative to a shift body axial direction.

4. The shift device according to claim 3, wherein the placement component is formed as a wiring substrate.

5. The shift device according to claim 3, wherein a mechanism other than the detection mechanism is disposed at the shift body axial direction of the placement component.

6. The shift device according to claim 3, wherein a mechanism other than the detection mechanism is provided at the placement component.

* * * * *